May 31, 1927.

E. G. DEUCHER 1,630,377

PROPELLING MECHANISM FOR CRANES

Filed March 1, 1926 6 Sheets-Sheet 3

INVENTOR.
Eugene G. Deucher
BY Richey & Watts
ATTORNEYS.

May 31, 1927.  1,630,377

E. G. DEUCHER

PROPELLING MECHANISM FOR CRANES

Filed March 1, 1926     6 Sheets-Sheet 4

INVENTOR.
Eugene G. Deucher
BY Richey & Watts
ATTORNEYS.

May 31, 1927. 1,630,377
E. G. DEUCHER
PROPELLING MECHANISM FOR CRANES
Filed March 1, 1926  6 Sheets-Sheet 6

INVENTOR
Eugene G. Deucher
BY
Richey & Watts
ATTORNEYS

Patented May 31, 1927.

1,630,377

UNITED STATES PATENT OFFICE.

EUGENE G. DEUCHER, OF CLEVELAND, OHIO, ASSIGNOR TO THE UNIVERSAL CRANE COMPANY, OF ELYRIA, OHIO, A CORPORATION OF OHIO.

PROPELLING MECHANISM FOR CRANES.

Application filed March 1, 1926. Serial No, 91,640.

This invention relates to mechanisms for propelling power operated cranes and similar apparatus, and more particularly to such apparatus which is designed to be mounted upon a wheeled vehicle and wherein the prime mover of the crane, or other apparatus, may be employed to selectively operate the various crane mechanisms and for propelling the vehicle to which it is attached.

In structures of the class specified, a superstructure is generally mounted so that it can be moved lengthwise and rotated upon a vehicle, such as a railroad car, by mechanism driven from a power plant carried upon the superstructure, and an object of my invention is to utilize such driving mechanism for propelling the car wheels by connecting it with power transmitting mechanism carried by the car.

Another object of my invention resides in mechanism for connecting and disconnecting propelling mechanism carried by a railroad car with driving mechanism carried by a superstructure mounted upon the car.

Another object of my invention resides in the manner of mounting propelling mechanism which is driven from a superstructure so that it will maintain a driving connection with the wheels of a railroad car in any lateral or vertical position the car trucks may assume upon the rails relative to the car frame.

Still another object of my invention resides in the mechanism I provide to maintain the superstructure stationary with the car when relative longitudinal movement is not desired.

These and other objects of my invention and the invention itself will appear more fully hereinafter.

In the drawings forming a part of this specification, wherein I have illustrated one embodiment of my invention.

Referring to the drawings by characters of reference, and particularly Figs. 1 to 11 inclusive in which I have illustrated one embodiment of my invention, 10 represents a flat bottom railroad car having rails 11 secured upon and extending longitudinally of the floor thereof. Such car is of a conventional type, being supported upon trucks 12 which have axles 13 journalled adjacent the ends thereof, and wheels 14 keyed to the ends of the axles. The wheels roll upon the usual stationary rails 15, and the trucks are connected to the car so that they can move both laterally and vertically relative thereto.

A base is mounted upon the tracks 11 and carries a turntable supporting frame which is movable transversely relative thereto. The superstructure carrying frame is rotatably mounted upon the turntable supporting frame, the above arrangement permitting the superstructure to be positioned to rotate at substantially any point above the car floor. Such structure is described and claimed in my pending application filed January 25, 1924, Serial No. 688,386.

The base consists of a pair of spaced axles 16, having flanged wheels 17 secured thereto, the axles having reduced ends 18 which project through bearings 19 carried by the angle beam frame member 20. Nuts are screwed upon the reduced ends of the axles to secure the frame member in position therewith.

Figure 1:
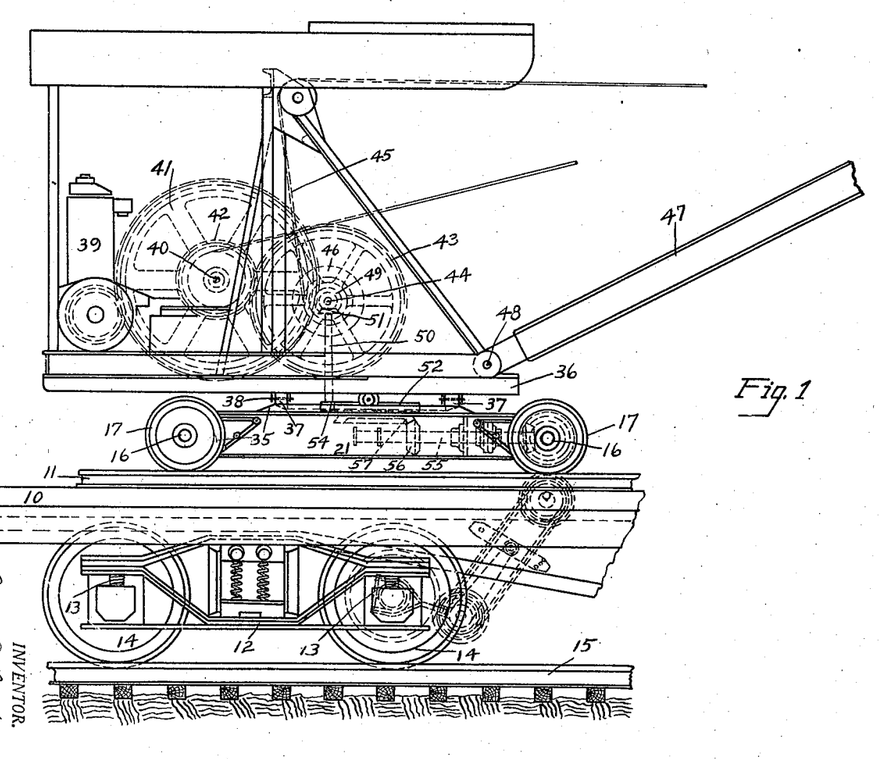
Fig. 1 is a side elevation of a power operated crane mounted upon a railroad car having my invention embodied therewith.
Figure 2:
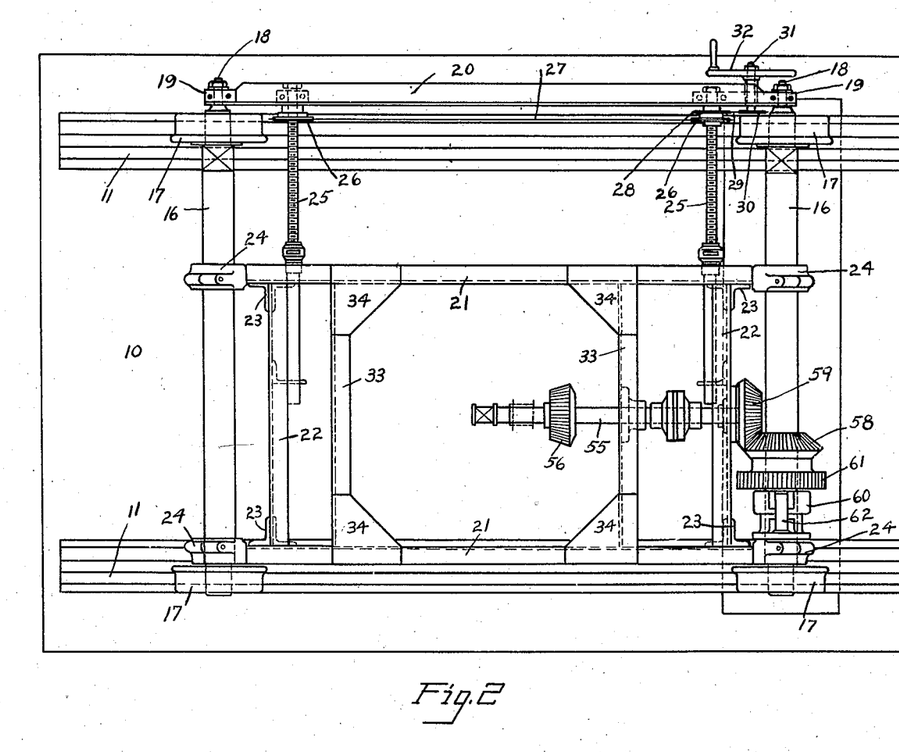
Fig. 2 is a plan view of the supporting frame of a superstructure mounted upon tracks on a car illustrating mechanism for moving the superstructure longitudinally and transversely upon the car.

A turntable supporting frame is mounted upon the axles 16 of the base, so that it can move transeversely relative to the base, and also provides a rigid spacing element for the axles at a point removed from the frame member 20. This frame consists of parallel longitudinal side members 21 and transverse end members 22 secured together by angle brackets 23. Journals 24, through which the axles 16 extend, are secured to and project from the ends of the longitudinal members 21. Thus, the frame is mounted intermediate the axles and is free to be moved lengthwise thereof. Threaded shafts 25 are mounted so that they rotate in the frame member 20 and extend into threaded bearings carried by the supporting frame. Sprockets 26 are secured to these threaded shafts and are connected by a driving chain 27. A sprocket 28 is also connected with one of the screw members and a chain 29 connects this sprocket with a sprocket 30 on shaft 31 carried by the frame member 20. A hand wheel 32 is secured to the outer end of the shaft 31 and by manually rotating the handle in opposite directions the chains and sprockets, just described, will rotate the threaded shafts 25, thereby causing the turntable frame to move transversely of the base, the journals 24 sliding on the axles 16 longitudinally relative to the axes thereof.

Parallel members 33 extend transversely of the side members 21 of the frame and are secured thereto, and angle plates 34 are secured to the top of the joints, so formed, to reinforce the same and to assist in supporting a circular turntable track 35 which is mounted upon the members 33, and upon the portion of the side members 21 intermediate the members 33.

The superstructure mechanism is carried by a frame 36 which is rotatably mounted upon the turntable track 35. The frame 36 is supported by rollers 37 which are pivoted in bearings 38 beneath the frame, the rollers traveling upon the circular track of the turntable base, when the superstructure is rotated. A motor power plant 39 is mounted upon the frame 36 and is geared to drive a shaft 40 which carries the cable winding drum 41, such shaft 40 in turn carrying a gear 42 which meshes with a gear 43 on shaft 44. A cable is wound upon a drum 46 on shaft 44 to raise and lower the boom 47 which is pivoted at 48 to the frame 36. A bevel gear 49 is secured to shaft 44 and a vertical shaft 50 is carried in bearings on the frame 36 so that a bevel gear 51 secured to the upper end thereof will mesh with the gear 49.

A large gear 52 is pivotally mounted upon a bearing 53, (Fig. 8) secured to the turntable base interiorly of the circular roller track, and a gear 54 is secured to the bottom of the vertical shaft 50 so that it is in mesh with the gear 52. The train of gears intermediate the engine and the gear 52 provide driving mechanism which is utilized to propel the base upon the tracks 11 on the car, to rotate the superstructure on the base, and to propel the wheels of the car upon tracks 15.

A shaft 55 is mounted in bearings on the turntable base frame, and a bevel gear 56 is keyed thereon so that it will mesh with a bevel gear 57 projecting from the underside of the gear 52. The end of the shaft 55 extends adjacent to one of the axles 16, on which is rotatably mounted a gear member having a bevel gear 58 at one end which meshes with the gear 59 keyed to the end of the shaft 55. A driving member 60 is keyed to the axle 16, on which the gear member is rotatably mounted, and is arranged adjacent one of the journal members 24 of the turntable frame. On the end of the gear member opposite the bevel gear 58 is formed a gear 61, such gear having recesses in the side thereof to receive a pin 62 slidably carried by the axle driving member 60. This pin can be operated in any conventional manner, to serve the function of a clutch, so that when positioned in engagement with one of the recesses in the side of the gear 61, a driving connection will be provided from the shaft 55 to the axle 16, the driving member being keyed to the axle upon which it is mounted. When the clutch is in, the base carrying the superstructure will be propelled upon the tracks 11 to plane the superstructure in desired longitudinal position upon the car.

In my pending application Serial No. 444,127, filed February 11, 1921, I have shown and described similar mechanism for rotating the superstructure and for propelling the superstructure supporting base upon tracks on the car as that shown in this application. In this connection it is pointed out that it is necessary that the gear 52 be maintained stationary when it is desired to rotate the superstructure, so that the rotation of the shaft 50 will cause the gear 54 to roll around the gear 52 thereby rotating the superstructure. The gear 52 must be released and free to rotate on its bearing when it is desirable to propel the base, so that the gear 54 will rotate the gear 52 and drive the mechanism associated therewith. Such means for controlling the connection of the gear 52 with its bearing is shown and described in the application just mentioned.

I will now describe the mechanism whereby the above driving mechanism is utilized to propel the car upon the tracks 15, which forms the subject matter of this invention.

Figures 3, 4, 5, 6, 7:
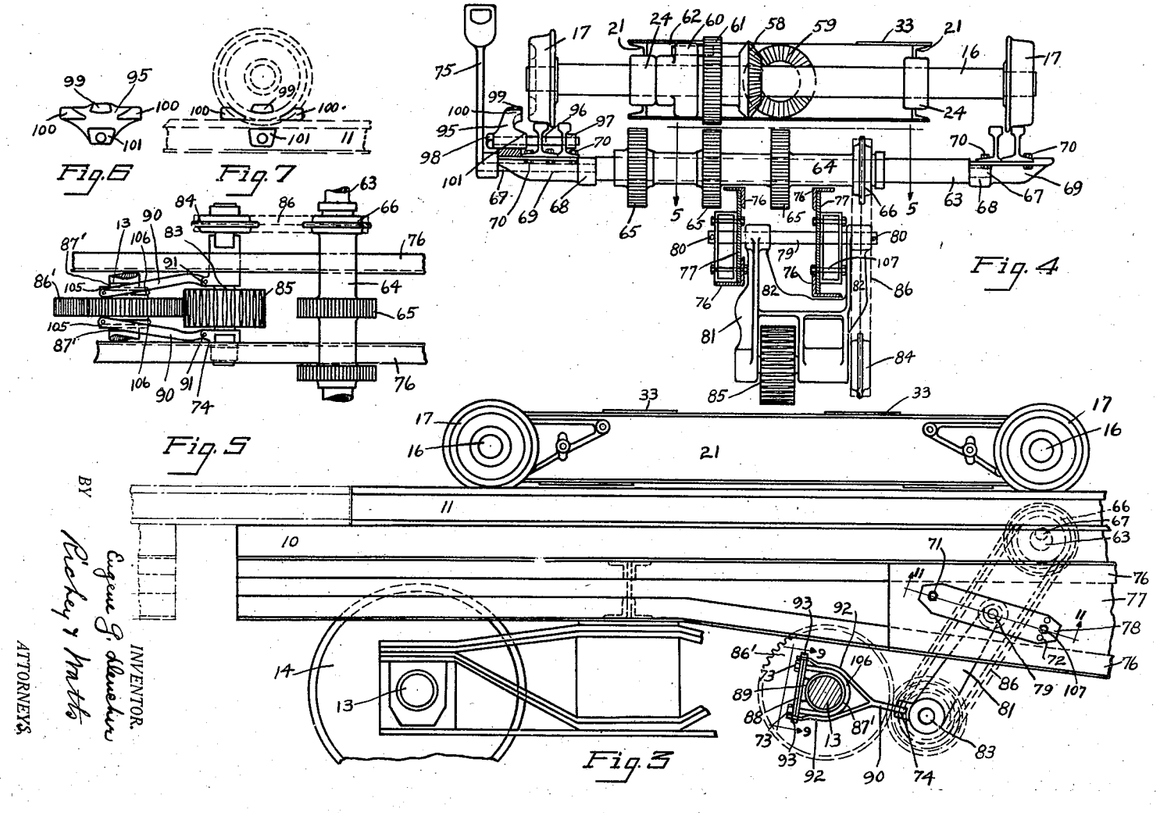
Fig. 3 is an enlarged fragmentary side elevation of the car showing the mechanism for transmitting power from the superstructure for propelling the car wheels.
Fig. 4 is an end elevational view of the mechanism shown in Fig. 3.
Fig. 5 is a plan view of the driving mechanism connected to the car axle for rotating the same, taken on line 5—5 of Fig. 4.
Fig. 6 is a side elevation of a clamp for securing a wheel of the superframe to the track on the car.
Fig. 7 is a similar view of the same engaging the track on the car and a wheel of the superframe.
Figures 8, 9, 11:
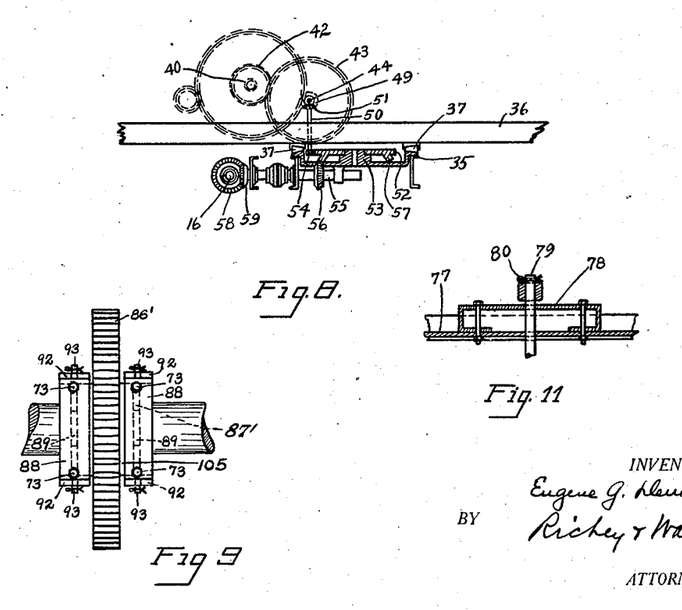
Fig. 8 is a fragmentary view partially in section showing the driving mechanism intermediate the motor and the base for rotating the superstructure and propelling the base on the car.
Fig. 9 is an end elevation of the mechanism for maintaining the driving mechanism with the driven gear on the car axle.
Fig. 11 is a sectional view taken on line 11—11 of Fig. 3 illustrating the adjustable bracket secured to the car.
Figure 10:
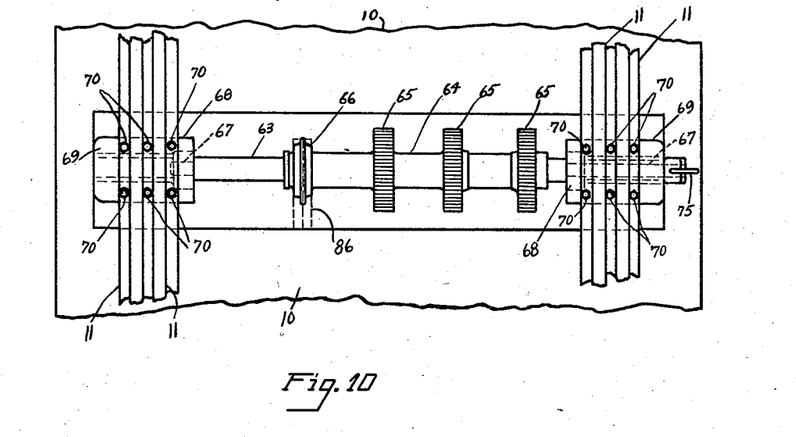
Fig. 10 is a top plan view of a fragment of the car, illustrating the manner of securing the mechanism which is driven directly from the mechanism carried by the superstructure carrying crane.

A shaft 63 Figs. 3, 4 and 5 extends transversely of the car and is rotatably mounted so that gears supported thereby can be driven from the gear 61 carried on axle 16 of the base. A hollow shaft 64 is loosely mounted upon the shaft 63 intermediate its ends and a plurality of similar gears 65 are secured therewith in spaced relation, and a sprocket 66 is secured at one end of the shaft. The shaft 63 is provided with reduced end portions 67, the axis of the end portions being eccentrically arranged relative to the axis of the main shaft 63, but extending in the same direction therewith. The shaft ends 67 are rotatably carried in bearing members 68 which are provided with extensions 69 which extend beneath the rails and are secured thereto by bolts 70, the floor being cut away to provide an aperture to receive the shaft 63, its bearings, and the gears carried thereby.

When the shaft 63 is rotated in its bearing supports, the eccentric arrangement of the ends thereof will cause the shaft to be raised or lowered in a vertical plane. One of the shaft ends 67 projects beyond the end of its bearing member, and a lever 75 is detachably secured thereto for rotating the same, when desired. The gears 65 are preferably arranged so that the gear 61 carried by the base axle will be in vertical alignment with one of the gears when the turntable frame is in its central position, or at either end of its transverse movement relative to the base. When it is desired to make a connection to drive the car wheels, the base is moved to a longitudinal position where the gear 61 can mesh with the gears 65, and the turntable frame is then moved transversely, by turning the handwheel 32, until the gear 61 is in alignment with any one of the gears 65. The lever 75 is then turned causing the shaft 63 to move upwardly until such aligned gears mesh. The gears all being secured to the shaft 64, and the sprocket 66 also being secured thereto will cause rotation of the sprocket when any one of gears 65 are in mesh with gear 61.

The under frame of the car includes parallel sets of upper and lower girders 76 which extend longitudinally and substantially centrally beneath the floor of the car. Vertically extending plates 77 are secured intermediate each upper and lower pair of girders and are provided with aligned apertures through which a shaft 79 projects. A bracket support 78 is secured to the outer surface of each of the plates 77 and is provided with aligned apertures which serve as bearings for the shaft 79. One end of these brackets is bolted at a single position by a bolt 71 with the plates, while the other end of the brackets are provided with a plurality of arcuately arranged apertures 72, so that a bolt 107 can secure such ends in a plurality of vertical positions with the plates 77. The shaft 79 is secured in position by cotter keys 80 which extend through their ends. A bracket member 81 is provided with upwardly extending arms 82 which have journals mounted to swing on the shaft 79. A shaft 83 is secured in bearings on the lower end of the bracket 81 and a sprocket 84 is keyed to one end of such shaft which projects from the side of the bracket. A gear 85 is also keyed to shaft 83 and rotates with its shaft when the sprocket 84 is rotated by a chain 86 extending around sprockets 66 and 84.

A gear $86^1$ is keyed to one of the car axles 13 and is arranged so that it normally aligns with gear 85. The teeth of the gear $86^1$ are arcuate in contour so that they will mesh to a sufficient degree with the arcuate teeth of gear 85 to maintain a driving connection therebetween during lateral movement of axle and truck relative to the car body, when the car is traveling around curves or inclined tracks. The gear $86^1$ is provided with hubs 105 Fig. 5 having circular grooves $87^1$ in the outer face thereof within which U-bolts 106 having threaded ends are seated. A pair of plates 88 Fig. 9 extend over the ends of each of the U-bolts, the inner plate having spacer blocks 89 provided with arcuate faces adapted to engage within the grooves $87^1$ in the hubs 105. The ends of the bolts extending through the plates are provided with nuts 73 which are adjusted thereon to secure the blocks within the grooves and to secure the U-bolts upon the hubs, so that they can rotate thereon. The bracket member 81 is provided with spaced lugs 74 extending therefrom on each side of the gear 85, and links 90 are secured therebetween by pins 91 permitting the links to swivel laterally. The opposite ends 92 of the links are bifurcated and are provided with apertures through which circular extensions 93 of the plates 88 extend. It will be seen that the mounting of the U-bolts permit the links to move in an annular direction on the shaft, and that the connection of the links with the plate extensions and the lugs on bracket 81 permits them to move laterally with the truck relative to the car. In this manner the gear 85 will be maintained in mesh with the gear 86¹ on the car shaft, in any position the axle may assume when the car truck moves either vertically or laterally relative to the car frame.

To compensate for the wear or stretch of the driving chain 86 the bearing members 78 are provided at one end with a plurality of arcuately arranged openings 72 so that it can be secured in desired vertical adjustment with the side plates 77 of the car body to regulate the distance between sprockets 66 and 84.

When the base propelling mechanism is to be utilized to drive the railroad car, I have provided a chock 95 to secure the base stationary after it has been moved to a position longitudinally to establish the driving connection. The chock is mounted on a shaft 96 which extends through apertures in the rails 11, the innermost of the rails having an internally threaded boss 97 through which the threaded end of the shaft is screwed. A head 98 is provided on the outer end of the shaft and can be engaged by a tool to rotate the shaft thereby moving the chock carried thereby into or out of locking engagement. The inner face of the chock is provided with space fingers 99, 100, and 101, the upper finger 99 extending against the inner periphery of the wheel thread surface, and the two side fingers 100 providing wedges between the rail and the tread surface of the wheel. The lower finger 101 is adapted to wedge against the rail beneath the rail head. As the chock is moved toward the wheel the fingers are wedged against the surfaces with which they engage, thereby securely locking the wheel stationary with the track.

Figure 12:
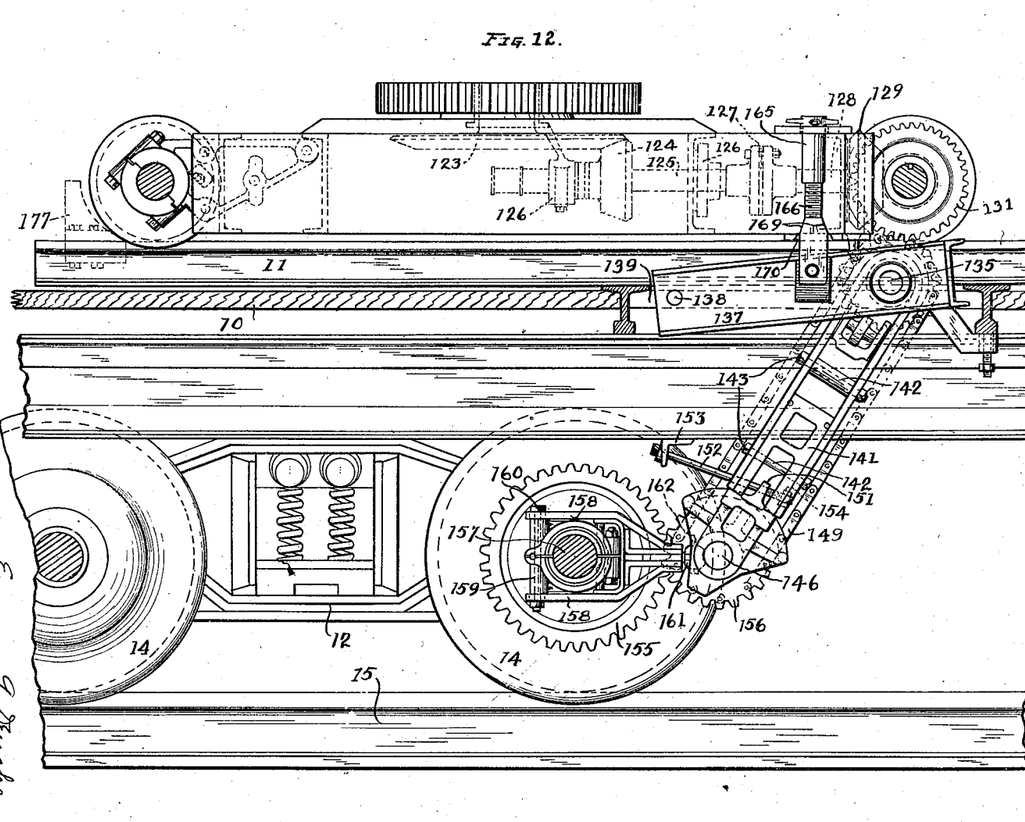
Fig. 12 is a side elevation partly in section of another embodiment of my invention showing the driving connection to the vehicle wheels.
Figure 13:
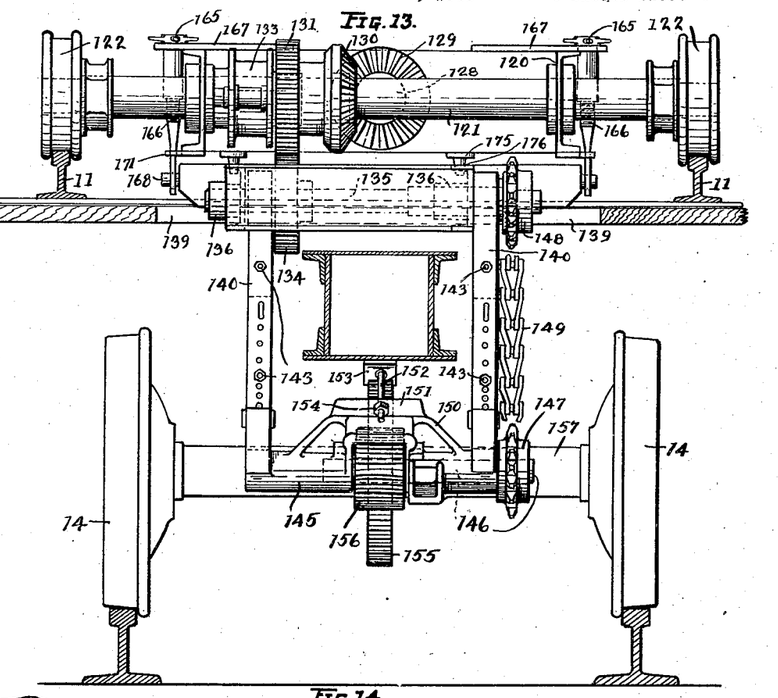
Fig. 13 is an end elevation of the vehicle and driving connection comprising this embodiment.
Figure 14:
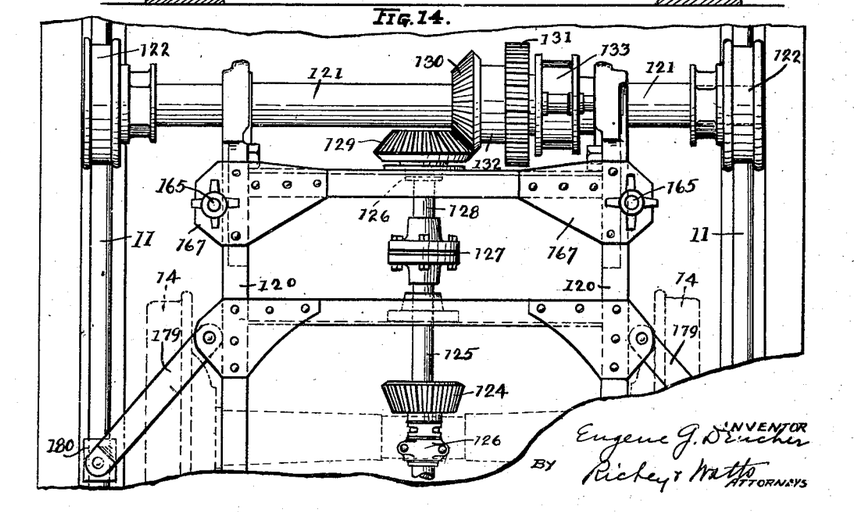
Fig. 14 is a top plan view of the same embodiment showing the crane turntable support mounted for longitudinal movement along the vehicle upon which the crane is carried.

In Figs. 12, 13 and 14 I have illustrated another embodiment of my invention wherein I have provided means for transmitting power selectively to drive the crane support along the tracks 11 which are carried by the upper surface of the flat car, and to transmit such power when desired directly to a mechanism for driving the vehicle upon which the crane support and mechanism is carried. In this embodiment of my invention I have also provided a novel means of securing the crane supporting frame into power transmission relation with the vehicle running gear. I have also provided other means for performing other functions which will be hereinafter further described.

The crane supporting carriage frame 120, Figs. 12, 13, 14 is provided with transverse axle members 121 at each end thereof having wheels 122 which travel along the tracks 11, thus enabling the carriage platform to be moved to any longitudinal position with respect to the vehicle on which the frame travels. Power from the prime mover of the crane mechanism is transmitted from the beveled gear 123 through a bevel gear 125, the latter gear being keyed to a shaft which is supported in bearings 126. A suitable coupling member 127 may be provided at one end of the shaft, said coupling member being connected to a similar member on a shaft 128. A bevel gear 129 is keyed to the end of shaft 128 as shown more clearly in Fig. 14 and meshes with a bevel gear 130. A gear 131 is formed upon a shoulder 132 the rear face of the bevel gear 130 and both gears 130 and 131 are mounted to rotate loosely about the axle 121. This gear 131 is provided with a clutch surface which in the present instance may be in the form of sockets or may be a frictional contacting surface. A second clutch member 133 is keyed to the axle 121 and rotates therewith and is adapted to be moved into engagement with the clutch surface formed on the gear 131, or I may provide a pin slidable between the clutch members for establishing a driving connection. It will be seen that when the gears 129 and 130 are in mesh and when the clutch members 131 and 133 are disengaged, that power imposed upon the shaft 128 will be transmitted through the bevel gears to drive the gear 134. When the clutch members 131 and 133 are engaged and the gear 134 is dropped out of engagement with the gear 131, power from the shaft 128 is transmitted through the clutch to drive the axle 121 and thereby move the crane supporting frame 120 longitudinally of the rails 11.

Power may be transmitted to drive the vehicle running gear to move the vehicle along the rails 15 through the gears 131 and 134. The gear 134 is keyed to the shaft 135 which is rotatably mounted transversely of the vehicle in aligned bearing 136 carried by a pair of substantially parallel arms 137. The arms are pivoted at 158 to the floor of the vehicle and may be rocked about the pivot to raise and lower the gear 134, carried by the shaft 136, into and out of engaging position with respect to the gear 131. In order to provide for properly supporting the shaft 136 and to provide for unrestricted movement of the gear 134 through the plane of the floor of the vehicle, I have provided an opening 139 in the floor of sufficient size and shape.

Suspended below the arms 137 is an adjustable frame including substantially parallel arms 140 having a series of aligned openings along opposite edges thereof. Slidable within each of the arms is a member 141 having openings therein arranged along opposite edges. These openings may be placed at irregular intervals if desired to provide a more precise adjustment of the member with respect to the arm. A locking bolt 142 is passed through the desired aligned openings in the arm of the member and a nut 143 is secured on the end of the bolt providing a locking means for maintaining the adjustment. The lower ends of the members 141 are formed upon a transverse housing 145. This housing 145 is adapted to rotatably support an axle 146 carrying on its outer end a sprocket wheel 147. A sprocket wheel 148 is keyed to the shaft 135 and is in alignment with the sprocket wheel 147. A sprocket chain 149 connects the two sprocket wheels and power applied to the shaft 135 is transmitted through the sprocket 148, and the chain 149, to the sprocket 147 and the shaft 146. It will be observed that the housing 145 and consequently the shaft 146 is adjustable toward and away from the shaft 135 and may be locked in any desired adjusted position, thereby providing a means for insuring a driving connection between the shafts whereby slack in the chain 149 may be taken up for various purposes such as to compensate for wear. Formed on the housing 145 is a yoke 150 which is provided with a flange substantially parallel with the shaft 146 and which extends upwardly between the arms 140. This flange 151 is provided with an opening for receiving the end of a bolt 152. As shown more clearly in Fig. 12, the bolt is supported from the under surface of the car body by a suitable bracket 153, the headed end of the bolt engaging a surface of the bracket to prevent displacement of the bolt therein. The other end of the bolt is screw threaded for a considerable distance of its length and is adapted to fit loosely within the opening in the flange 151. A nut 154 may be screwed on to the end of the body 152 as the end of the bolt has been placed through the opening in the flange 151, to prevent displacement of the arms 140 to the right in Fig. 12. One of the purposes of this bolt and the flange 151 formed integrally with the housing 145, is to hold the arms 140 in position so that the gears 155 and 156 are safely out of mesh when the pin 162 is removed. When the nut 154 is served upon the bolt 152 it engages the flange 151 and helps move the gears 155 and 156 into correct meshing position. The nut 154 will thereby limit the outward swing of the gear 156. The gear 156 is keyed to the shaft 146 and is provided with teeth, each tooth having a varying depth in such a manner as to provide an arcuate surface on the periphery of the gear, the center lines of the respective arcs passing through the gear 156 substantially midway of the end surfaces of the gear.

Certain of the car wheels 14 are supported by an axle 157 on which the gear 155 is keyed. A suitable means of supporting the gear 156 in meshing relation with the gear 155 is provided in the form of a loose fitting and pivoted coupling member 158. This coupling member preferably consists of multiple sections 158 extending on either side of the axle 157 and having openings which are in alignment with an opening in the bolt receiving member 159. This latter member is loosely clamped about the axle 157 and is adapted to support the ends of member 158 as shown, a bolt 160, passing through the openings in members 158 and 159 providing a pivot point about which the members 158 swing. The forward ends of the members 158 converge and terminate in a suitable connection 161, for securing the coupling device to the housing 145. A pin 162 is provided for detaching the coupling device 161 from the housing 145 to permit the gear 156 to be removed from meshing contact with the gears 155.

Referring more particularly to Fig. 12, it will be seen that the construction represented by the coupling device 158, the arms 140 and the arms 137 form a frame-like structure pivoted about centers 157, 146, 135 and 138. The structure is similar to a parallelogram except for one side, wherein the sides are each pivotally connected to their adjacent sides, so that movement of one side will cause movement of the other sides.

Provision has been made for maintaining the gears 155 and 156 in constant mesh when it is desired to transmit power through the mechanism to drive the vehicle as when the vehicle is rounding a curve. This means has already been described and consists of providing teeth on the gear 156 each having a varying depth of substantially arcuate contour. In this way the gears 155 and 156 may be maintained in meshing relation regardless of the shifting of the truck as when the vehicle is rounding a curve, thus maintaining a positive driving connection to drive the axle 157 and thereby maintain the vehicle in motion, as long as power is applied to the gear 131.

I have provided means for accurately positioning the movable frame 120 so that the gear 131 will be in the correct position for meshing with the gear 134 when it is desired to transmit power from the power unit through these gears and other mechanism described hereinbefore to drive the vehicle along the rails 15.

I have also provided means for elevating the gear 134 which is rotatably supported by the upper ends of the arms 140, so that the gears 131 and 134 will be in approximate meshing position to transmit power for driving the vehicle.

When it is desired to elevate the gear 134 as by swinging the arms 140 about the pivot formed by the shaft 146, such action is accomplished by means of telescoping screw threaded members 165 and 166 which are each provided on opposite sides of the movable frame 120. The member 166 is screw threaded on one and cooperates with internal screw threads carried by the member 165. The member 165 is loosely and rotatably carried within an enlarged opening formed in a plate 167. By rotating the member 165 which is provided at its upper end with fingers for engagement with a wrench or which may be grasped by the hand of the operator and turned manually, the members 155 and 166 are caused to move one within the other. The lower end of each of the members 166 is provided with an opening which is adapted to pass over a pin 168 carried by each of the members 137. As the members 166 are lifted or lowered the members 137 will likewise be lifted or lowered, thereby causing the gear 134 which is rotatably supported between the members 137 to be elevated or lowered, as the case may be, into and out of meshing relation with the gear 131. It will be noted that the members 166 are provided with beveled faces 169 and that the entire lower ends of each of the members 166 pass through openings 170 when the member 166 is lifted or lowered. The opening 170 is formed in a plate 171 and the walls of the opening are preferably beveled as shown more clearly in Fig. 12, so that when the frame 120 is moved to approximate meshing position by hand or power and when the member 165 is rotated in the proper direction to cause the member 166 to be elevated, the beveled walls 169 of member 166 will engage the corresponding beveled walls of the opening 170. By means of the coacting beveled walls, further movement of the member 166 upwardly will cause the members 165 and 166 to rock about the pins 168 as pivots and will cause movement of the frame 120 in the desired direction either to the right or left, as shown in Fig. 12, in such a manner that by the time the members 137 and the gear 134 are elevated sufficiently to afford a meshing engagement with the gears 131 and 134, it will be found that the gear 131 will be in accurate meshing position.

I have provided downwardly projecting pins 175 which are rigidly carried by the under surfaces of the movable frame 120 and which are in alignment with openings 176 which are provided in the upper surfaces of each of the members 137. When the gears 131 and 134 have been moved to the correct meshing position with respect to each other, it will be found that the pins 175 will project into the openings 176, thereby providing a locking means for preventing longitudinal or even lateral movement of the frame 120 or the members 137.

Referring more particularly to Fig. 12, I have provided a rail block 177 which is detachably secured to the head of the rail 11. It is the purpose of this block to position the movable frame 120 along the rails 11 in approximately the position desired for meshing of the gears 131 and 134 before the latter is elevated. As the latter is elevated the gear 131 is brought into more accurate meshing position by means of the members 165 and 166, as has already been described.

Referring particularly to Fig. 14, I have shown broken away, brace arms 179 which are pivotally secured at one end to the frame 120 and extend outwardly and downwardly and are provided at their other ends with rail head clamps 180 which may be clamped over the heads of the rails 11. It is the purpose of these braces to brace the frame 120 against any tendency of the frame to tilt laterally of the vehicle, which may be caused by a shifting of the load or an excessive load at a distance too great from the center line of the vehicle to destroy the normal balance of the frame 120 thereon.

It is to be understood that various changes may be made in the construction of my apparatus without departing from the spirit of my invention or the scope of the appended claims.

I claim:—

1. A traveling power crane structure comprising a vehicle, a base movably mounted on said vehicle, a rotatable superstructure mounted upon said base, an engine carried by said superstructure, mechanism connected with said engine for propelling said base upon said vehicle, and mechanism adapted to be connected with the base propelling mechanism for propelling said vehicle.

2. A traveling power crane structure comprising a vehicle, a base movably mounted upon said vehicle, a rotatable superstructure mounted upon said base, an engine carried by said superstructure, mechanism connected with said engine for propelling said base upon said vehicle, and mechanism carried by said vehicle adapted to be connected with said base propelling mechanism for propelling said vehicle.

3. A traveling power crane structure comprising a vehicle, a base movably mounted upon said vehicle, a superstructure rotatably carried by said base, an engine carried by said superstructure, mechanism connected with said engine for rotating said superstructure, mechanism connected with said superstructure rotating mechanism for propelling said base upon said vehicle, and mechanism carried by said vehicle adapted to be driven from said base propelling mechanism for propelling said vehicle.

4. A traveling power crane structure comprising a wheel supported vehicle frame, a movable base frame mounted upon said vehicle frame, a movable frame carried by said base frame, a superstructure rotatably mounted upon said frame, an engine supported by said superstructure, mechanism connected with said engine for propelling said base frame upon said vehicle frame, mechanism for moving said superstructure carrying frame relative to said base frame, and propelling mechanism carried by said vehicle adapted to be connected with said base propelling mechanism when said superstructure supporting frame is moved into any one of a plurality of positions on said base frame.

5. A traveling power crane structure comprising a wheel supported vehicle frame, a base frame movable longitudinally upon said vehicle frame, a frame carried by said base frame and movable transversely thereupon, a superstructure rotatably mounted upon said frame, an engine carried by said superstructure, mechanism carried by said superstructure supporting frame for propelling said base frame, said mechanism being adapted to be connected with said engine, a shaft extending transversely of said vehicle frame and mounted therewith, a plurality of spaced gears carried by said shaft, and mechanism connected with said gears for propelling said vehicle frame when said superstructure supporting frame is moved to a position to connect the propelling mechanism carried thereby with any one of the gears on said shaft.

6. A traveling power crane comprising a vehicle frame supported on wheels, a shaft extending transversely of said vehicle frame and mounted eccentrically therewith, a gear carried by said shaft, propelling mechanism carried by said vehicle frame intermediate said gear and the vehicle wheels, a movable base frame longitudinally carried upon said vehicle frame, a superstructure including an engine carried by said base frame, mechanism including a gear connected with said engine for propelling the base frame upon said vehicle frame, the gear of said base frame propelling mechanism being adapted to mesh with the gear on said shaft, and means for rotating said shaft to move said gear carried thereby into or out of engagement with the gear of the base frame propelling mechanism.

7. In a power crane, a vehicle frame having supporting wheels carried by axles mounted thereon, a gear secured to one of said axles, a superstructure including an engine carried by said frame, a bracket pivotally connected to said frame, a gear carried by said bracket adapted to mesh with the gear on said axle, means for maintaining said gears in mesh, and mechanism connected with said engine for driving the gear carried by said bracket.

8. In a power crane, a vehicle frame, a truck including axles and wheels secured to the axles, said truck supporting said vehicle frame and being movable vertically and laterally relative thereto, a gear secured to one of said axles, a superstructure including an engine carried by said frame, a bracket pivotally connected to said frame, a gear carried by said bracket and adapted to mesh with said gear on the truck axle, mechanism connected with said engine for driving the gear carried by the bracket, and means for maintaining said gear in mesh when said truck moves relative to said vehicle frame.

9. In a power crane, a vehicle frame, a truck including axles and wheels secured to the axles, a gear secured to one of said axles, said truck supporting said frame and being connected to move vertically and laterally relative thereto, a superstructure including an engine carried by said frame, a bracket pivotally connected to said frame, a gear carried by said bracket and adapted to mesh with said gear on the truck axle, driving mechanism connecting the gear carried by said bracket with the engine, and a link for maintaining said gears in mesh, said link being connected with said bracket and the truck axle to which the gear is secured.

10. In a power crane, a vehicle frame a truck including axles and wheels secured to the axles, a gear secured to one of said axles, said truck supporting said frame and being connected to move vertically and laterally relative thereto, a superstructure including an engine carried by said frame, a pivoted bracket, adjustable means for securing said bracket to said vehicle frame, a rotatable gear carried by said bracket and adapted mesh with said gear on the truck axle, driving mechanism connecting the gear carried by said bracket with the engine, and a link for maintaining said gears in mesh, said link being connected with said bracket and the truck axle to which the gear is secured.

11. In a power crane, a vehicle frame including a flooring, said flooring having a transverse slot therein, rails secured longitudinally upon said flooring, bearing members secured to said rails within the slot in said flooring a shaft mounted in said bearing members, a gear on said shaft, a superstructure including an engine mounted to travel upon the rails on said flooring, driving mechanism connecting said gear with said engine, a truck including axles and wheels, and driving mechanism connecting said gear with said axle.

12. A traveling power crane comprising a vehicle frame, a truck supporting said vehicle frame, a base frame movable longitudinally upon said vehicle frame, a superstructure rotatably mounted upon said base frame, a source of power carried by such structure, power transmission means depending from said vehicle frame and connected in driving relation with the wheels of one of the trucks and power transmission means carried by said base frame and adapted to be moved therewith into driving relation with said first named power transmission means.

13. A traveling power crane comprising a vehicle frame, a truck supporting said vehicle frame, a base frame movable longitudinally upon said vehicle frame, a superstructure rotatably mounted upon said base frame, a source of power carried by such structure, power transmission means depending from said vehicle frame and connected in maintained driving relation with certain of the wheels of the truck and power transmission means carried by said base frame and adapted to be moved therewith into driving relation with said first named power transmission means.

14. A traveling power crane comprising a vehicle frame, a truck supporting said vehicle frame, a base frame movable longitudinally upon said vehicle frame, a superstructure rotatably mounted upon said base frame, a source of power carried by said superstructure, vehicle driving mechanism depending from said vehicle frame and in driving connection with certain of the wheels of said truck, and power transmission means movable with said base frame into driving relation with said driving mechanism, said driving mechanism being adjustable to effect a positive driving relation with the power transmission means.

15. A traveling power crane comprising a vehicle frame, a truck supporting said vehicle frame, a base frame movable longitudinally upon said vehicle frame, a superstructure rotatably mounted upon said base frame, a source of power carried by said superstructure, vehicle driving mechanism depending from said vehicle frame and in driving connection with a truck axle, and power transmission means movable with said base frame into driving relation with said driving mechanism, said driving mechanism being adjustable substantially vertically to effect a positive driving relation with the power transmission means.

16. A traveling power crane comprising a vehicle frame, a truck supporting said vehicle frame, a base frame movable longitudinally upon said vehicle frame, a superstructure rotatably mounted upon said base frame, a source of power carried by said superstructure, vehicle driving mechanism depending from said vehicle frame and in driving connection with a truck axle, and power transmission means movable with said base frame into driving relation with said driving mechanism, said driving mechanism being adjustable and means to position said driving mechanism in positive driving relation with said power transmission means.

17. A traveling power crane comprising a vehicle frame, a truck supporting said vehicle frame, a base frame movable longitudinally upon said vehicle frame, a superstructure rotatably mounted upon said base frame, a source of power carried by said superstructure, vehicle driving mechanism depending from said vehicle frame and in driving connection with a truck axle, and power transmission means movable with said base frame into driving relation with said driving mechanism, said driving mechanism being adjustable and means to position said driving mechanism in positive driving relation with said power transmission means, said positioning means including telescoping cooperating members.

18. A traveling power crane structure comprising a vehicle, a base movably mounted on said vehicle, a rotatable structure mounted upon said base, an engine carried by said structure, mechanism connected with said engine for propelling said base upon said vehicle, mechanism for propelling said vehicle, and means whereby said base propelling mechanism and said vehicle propelling mechanism may be selectively coupled to be driven by said engine.

19. A traveling power crane structure, comprising a vehicle, a base movably mounted upon said vehicle, a rotatable superstructure mounted upon said base, an engine carried by said superstructure, means for propelling said base upon said vehicle, and means for propelling said vehicle, said base propelling means and said vehicle propelling means being capable of being independently coupled to said engine for operation.

20. A traveling power crane structure comprising a vehicle, a base movably mounted on said vehicle, rotatable superstructure mounted upon said base, an engine carried by said superstructure, means for propelling said base upon said vehicle, and means for propelling said vehicle, said last named means including a nonrigid frame and mechanism carried by the frame for transmitting power to one of the vehicle axles, said frame being capable of being shifted so that the power transmitting mechanism carried thereby may be moved into and out of power coupled relation with said engine.

21. A traveling power crane structure comprising a vehicle, a base movably mounted on said vehicle, rotatable superstructure mounted upon said base, an engine carried by said superstructure, means for propelling said base upon said vehicle, and means for propelling said vehicle, said last named means including a nonrigid frame and mechanism carried by the frame for transmitting power to one of the vehicle axles, said frame being capable of being shifted so that the power transmitting mechanism carried thereby may be moved into and out of power coupled relation with said engine, and means for shifting said frame.

22. A traveling power crane structure comprising a vehicle, a base movably mounted on said vehicle, rotatable superstructure mounted upon said base, an engine carried by said superstructure, means for propelling said base upon said vehicle, and means for propelling said vehicle, said last named means including a nonrigid frame and mechanism carried by the frame for transmitting power to one of the vehicle axles, said frame being capable of being shifted so that the power transmitting mechanism carried thereby may be moved into and out of power coupled relation with said engine, and means for positioning said superstructure with respect to said frame in proper power coupled relation.

In testimony whereof I hereunto affix my signature this 28th day of January, 1926.

EUGENE G. DEUCHER.